Figure 1:
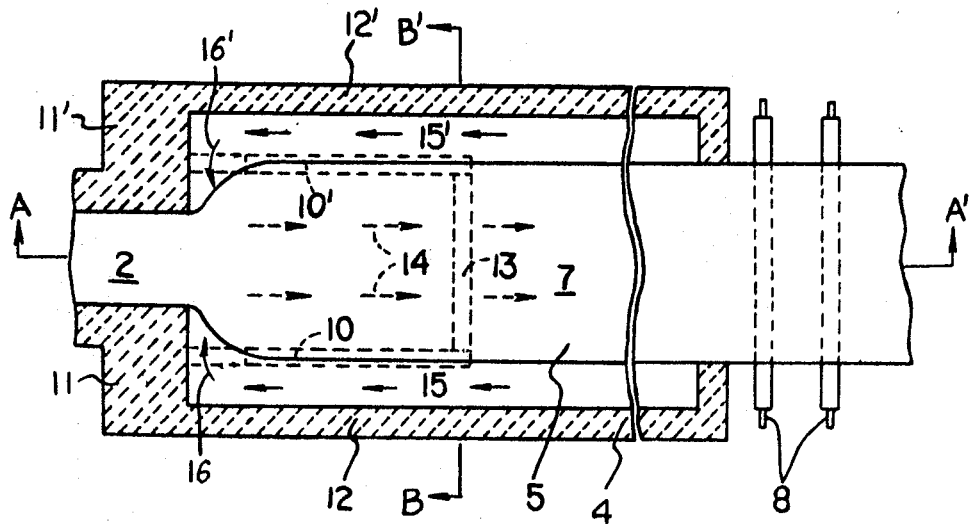

United States Patent [11] 3,607,199

[72] Inventors Kiyoshi Itakura
Nishinomiya-shi;
Seizo, Noguchi, Amagasaki-shi, both of Japan
[21] Appl. No. 761,030
[22] Filed Sept. 20, 1968
[45] Patented Sept. 21, 1971
[73] Assignee Nippon Sheet Glass Co., Ltd.
Osaka, Japan
[32] Priority Sept. 29, 1967
[33] Japan
[31] 42/62729

[54] FLOAT GLASS APPARATUS WITH FLOW CONTROL DAMS
6 Claims, 5 Drawing Figs.
[52] U.S. Cl. .................................................. 65/182 R, 65/99 A
[51] Int. Cl. ..................................................... C03b 18/02
[50] Field of Search .......................................... 65/99, 182

[56] References Cited
UNITED STATES PATENTS
3,317,302  5/1967  Misson ........................ 65/182 X
3,395,996  8/1968  Loukes ........................ 65/182 X
3,485,617 12/1969  Lawrenson .................. 65/182

Primary Examiner—S. Leon Bashore
Assistant Examiner—J. B. Hardaway
Attorney—Winderoth, Lind & Ponack ABSTRACT: In a float process for the manufacture of float glass on a molten metal bath, physical dam barriers are disposed longitudinally and laterally in the bath in a U-shape form in plan view, so as to form predetermined and separated backflow currents at laterally opposite sides of the glass ribbon being formed, which backflow currents flow from the downstream and progressively cooled end of the molten bath back toward the hottest or upstream end thereof flowing around or through the longitudinal barrier ends, as spaced from the upstream end walls of the bath tank, to reenter and rejoin the bath flow beneath the glass ribbon at the upstream or glass-entering end to thereby become gradually and sufficiently reheated, thereby together serving to remove a potential cause for effecting irregularities in the flatness of the glass.

KIYOSHI ITAKURA AND SEIZO NOGUCHI,
Inventors

BY Wenderoth, Lind & Ponack
Attorneys 3,607,199

FLOAT GLASS APPARATUS WITH FLOW CONTROL DAMS

This invention relates to an apparatus for the continuous manufacture of glass sheets using a molten metal bath and, particularly to an apparatus for the manufacture of sheet glass of good flatness by controlling the flow of the molten metal in the molten metal bath.

In the manufacture of continuous glass ribbon by feeding molten glass at controlled rates onto a molten metal bath and advancing the glass over the bath, the molten metal is, upon contact with the advancing glass ribbon, caused to flow in the direction from the inlet for the molten glass to the outlet for the glass ribbon. Hence, a return flow of the molten metal occurs in a direction opposite to that of the advancing flow. This return flow consists of two main flows, one running at the portions outside the two side edges of the glass ribbon, i.e. at the portions where no glass is existent, and the other running underneath the glass ribbon at the portions deeper than where the advancing flow runs, in a direction opposite to the direction of advance of the glass ribbon, i.e. from the outlet for the glass ribbon to the inlet for the molten glass.

For forming and solidifying the molten glass, the molten metal bath is provided with a temperature gradient gradually decreasing from the inlet for the molten glass to the outlet for the glass ribbon. Hence, when the above described return flow of the molten metal is caused to occur, a part of the return flow of the molten metal of a comparatively lower temperature which returns along the bottom of the molten metal bath tank is caused to wreathe upwards by the molten metal of a high temperature advancing along the lower surface of the glass, and they are mingled with each other. Consequently, there are brought about irregularities of the temperature in the advancing flow of the molten metal running along the lower portion of the glass. In other words, the return flow of a lower temperature creeps under the glass ribbon during its formation and cools partially the lower surface of the glass ribbon, thus resulting in irregularities of the viscosity in the glass. The glass ribbon advancing on the bath is always subjected to tensile force by a conveyor of an annealing furnace. Thus, when the glass ribbon whose viscosity is uneven in its lower portion is subjected to such tensile force, ripples are formed on the lower surface of the glass ribbon. Particularly, once such ripples are formed on the glass ribbon within a temperature range from of about 970° C., down to about 880° C., it is quite difficult to dispel such ripples, and they tend to remain on the solidified glass sheet, with the consequence that the commercial value of the product is greatly lowered.

The object of the present invention is to provide an apparatus for use in the manufacture of glass ribbon wherein the above described defect is overcome by controlling the flow of the molten metal in the bath of the molten metal.

More specifically, the present invention provides an apparatus for use in continuous manufacture of glass ribbon by feeding a molten glass onto a bath of a molten metal and advancing it over the bath, which comprises a tank for holding said bath; a pair of longitudinal dams disposed on the floor of said tank spaced from the sidewalls of said tank, along both side edges of said glass ribbon in the vicinity of both ends of said glass ribbon, said dams being so arranged as to provide a path communicating the molten metal between each of said longitudinal dams and each of said sidewalls of the tank with the molten metal defined by both of said longitudinal dams in the vicinity of the inlet or upstream end walls of said tank on the molten glass inlet side and a lateral dam so disposed as to be in contact with each of said longitudinal dams in the vicinity of the ends farther from said end walls, of said longitudinal dams, said lateral dam extending from the floor of the tank to the vicinity of the surface of the molten metal.

It is preferred that each of the longitudinal dams has a depth extending from the floor of the tank to the vicinity of the surface of the molten metal and that the longitudinal dams having such depth are so positioned that the side edges of the glass ribbon may advance above said dams. Further, it has been found that preferable results are obtained when said longitudinal dams are disposed along the zone where the temperature of the glass ribbon advancing over the bath is maintained within a range of from 970° C. to 800° C.

The present invention will be detailed hereinbelow by referring to the accompanying drawings.

Figure 2:
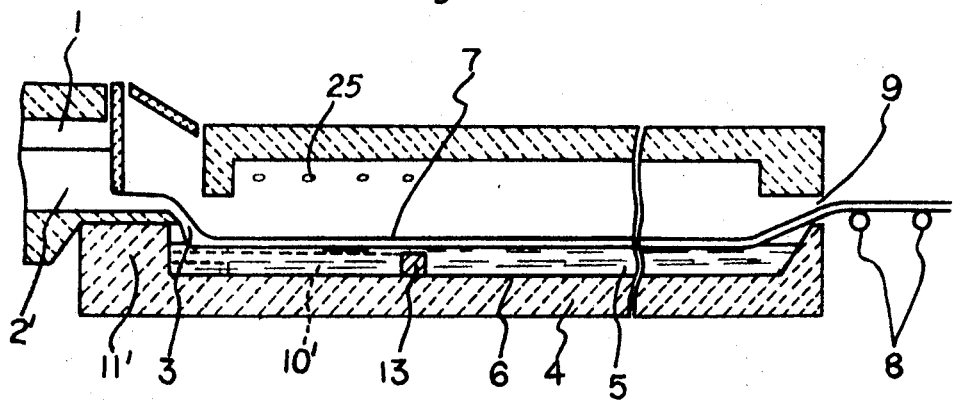
Figure 3:
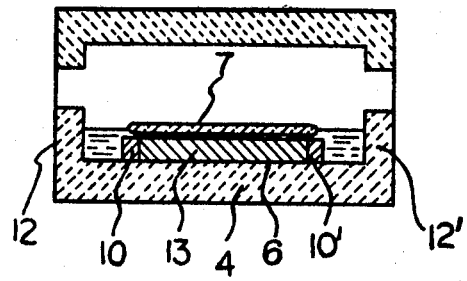
Figure 4:
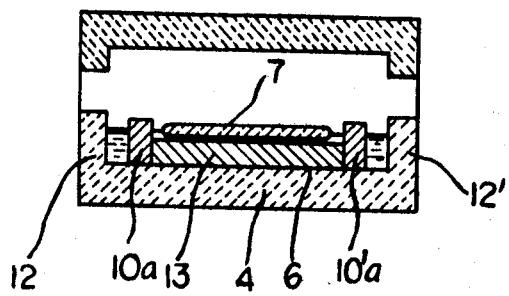
Figure 5:
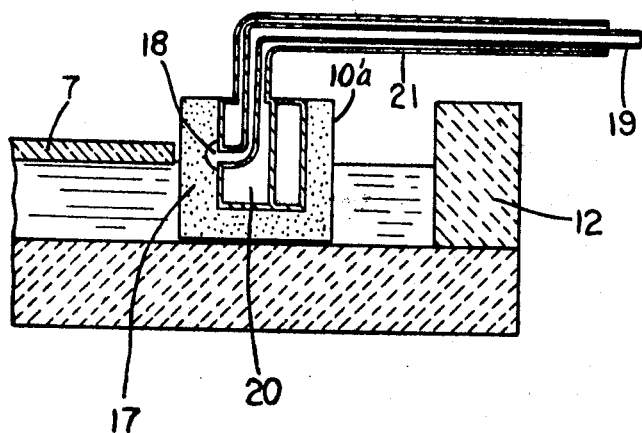

The drawings illustrate embodiments of the present invention, in which FIG. 1 is a plane view of one embodiment, FIG. 2 is a side view showing a longitudinal section taken along the line A—A' of FIG. 1, FIG. 3 is a view showing a cross section taken along the line B—B' of FIG. 1, FIG. 4 is a view similar to FIG. 3 and illustrates another embodiment of the present invention, and FIG. 5 is a view illustrating a cross section of an instance of the longitudinal dam applicable to the apparatus of the present invention.

Molten glass 2 melted at a glass-melting furnace 1 is fed from a molten glass inlet 3 onto a molten metal 5 contained in a tank 4 where the temperature is maintained by heating means 25. Molten glass 2 fed onto the molten metal 5 splays on the molten metal bath 5 and advances over the molten metal bath 5 to become cooled and hardened while being formed into a glass ribbon 7. It is then conveyed out of the tank 4 via a glass ribbon outlet 9 by means of a conveyor 8 of an annealing furnace (not shown).

Reference numerals 10, 10' denote a pair of longitudinal dams which are provided alongside the two side edges of the glass ribbon 7 just below said side edges, spaced apart from the upstream end walls 11, 11' on the glass inlet side of the molten metal tank 4 as well as sidewalls 12, 12' of the molten metal tank 4, and which have a substantial length extending from a floor 6 of the bath tank 4 to the vicinity of the molten metal surface. It is preferred that said longitudinal dams are provided alongside the two edges of the glass ribbon in a zone of above 880° C. where ripples tend to be formed on the glass ribbon.

The reference numeral 13 denotes a lateral dam which is disposed in the vicinity of the ends farther from the end walls 11, 11', of said pair of longitudinal dams 10, 10' and is in contact with each of said longitudinal dams 10, 10', and which extends from the floor 6 of said tank 4 to the vicinity of the surface of the molten metal bath 5.

The tank 4 is stored in a metal case (not shown), and refractories of the tank 4, the longitudinal dams 10, 10' and the lateral dam 13 are fastened to said metal case by means of bolts buried in these refractories, so that they are never caused to float on the molten metal bath 5.

In manufacturing glass ribbon by employing the above-described apparatus, the molten metal contained in the tank 4 tends to flow in the direction of an arrow 14 along with the glass ribbon 7 below the glass ribbon 7. The return flow corresponding to said advancing flow is obstructed by the existence of the lateral dam 13, and hence it is caused to run in the directions indicated by arrows 15, 15' outside the two side edges of the glass ribbon 7 where no glass is existent. The return flow running the directions of arrows 15, 15** is prevented from wreathing upwardly into the lower portion of the glass ribbon 7 under formation by means of the existence of the longitudinal dams 10, 10', and hence the return flow follows outwardly along the longitudinal dams 10, 10'. It subsequently advances in the directions of arrows 16, 16' and returns below the glass ribbon 7 from the high temperature zone in the vicinity of the glass inlet 3. It is preferred that the return flows 16, 16' are made to return below the glass ribbon whose temperature is above 970° C.

In accordance with this invention, the return flow is gradually heated during its return travel to the high temperature zone without any contact with the glass ribbon under formation, and it returns below the glass ribbon from the zone maintained at such high temperatures that the return flow does not give any bad influence to the formation of glass ribbon, with the consequence that occurrence of ripples on the lower surface of the glass ribbon can be prevented and a glass sheet of excellent flatness is obtainable.

One embodiment of this invention has been detailed hereinabove by referring to FIG. 1 to 3, but this invention is not to be restricted to such embodiment alone. For instance, as is illustrated in FIGS. 4 and 5, the longitudinal dams 10a, 10a' may protrude from the surface of the molten metal bath outside the two lateral sides of the glass ribbon 7. Further, as is shown in FIG. 5, the longitudinal dams 10a, 10a' may be arranged to as to be provided with a gas lubrication structure. The longitudinal dams shown in FIG. 5 are composed of a gas-permeable porous refractory material 17 at least in the portion facing the side edge of the glass ribbon, and a cavity 18 is provided inside said portion to extend along the longitudinal direction of said dams. A pipe 19 for introducing a pressurized gas into said cavity 18 is so communicated with said cavity 18 that the pressurized gas may be projected to the side edges of the glass ribbon via said gas permeable porous refractory material. Inside the longitudinal dam 10 there is provided a cooling chamber 20 for cooling the said dam, to which cooling chamber 20 a cooling medium is introduced and recycled by means of conduits 21.

Still further, in the above described embodiments the longitudinal dams 10, 10' are disposed spaced apart from the end walls 11, 11' on the molten glass inlet side of the tank so as to provide paths for the molten metal, but it is not necessary to dispose longitudinal dams spaced apart from the end walls 11, 11', so long as the structures of the dams at their end portions nearer to the end walls 11, 11' are so designed that paths for the return flows 16, 16' may be formed, e.g. by means of tunnels penetrating the dams 10, 10' at their lower portions.

What we claim is:

1. In an apparatus for use in the continuous manufacture of glass ribbon by floating a molten glass onto a bath of a molten metal supported by bath tank floor, side and end wall means, and advancing said molten glass downstream where it and the molten bath gradually cool, from an initial upstream starting point, over the bath, the improvement comprising in combination therewith a pair of longitudinal dams (10, 10') disposed on the floor (6) of said tank (4) and spaced laterally in from sidewalls (12,12') of said tank (4), along both side edges of said glass ribbon (7); said dams (10, 10') extending up/into from said floor the vicinity of both lateral sides of said glass ribbon (7); said dams (10, 10') being constructed and so arranged as to provide a back flow path for communicating the molten bath metal between the respective longitudinal dams (10, 10') and each of said tank side walls (12, 12') of said tank (4), and said paths further extending around and between upstream disposed portions of said longitudinal dams (10, 10') and adjacent the end wall means (11, 11') of the tank on the molten glass inlet side; and further including a transverse dam (13) having laterally extending opposite portions in contact with each of said longitudinal dams (10, 10') in the downstream vicinity thereof disposed a substantial distance from said end wall means (11, 11'); said transverse dam (13) also extending from the tank floor (6) upwardly to the vicinity of the surface of the molten metal, whereby the gradually cooled molten metal in backflow currents of the molten bath metal are maintained separate from the main downstream flow of molten bath metal induced by the flow from the main downstream flow of molten glass directed downstream thereover, and said backflow currents are gradually reheated upon and during reentering the upstream hotter temperature bath metal to reflow downstream again beneath the molten glass ribbon.

2. The apparatus as defined in claim 1 wherein each of the longitudinal dams (10, 10') is of a depth whereby the upper surface thereof is in the vicinity of the molten metal surface, and is disposed so that the side edges of the glass ribbon advance above said upper surface thereof.

3. The apparatus as defined in claim 1 further including means whereby a generally upstream zone of the molten glass is maintained at a temperature range of from about 970° C. to 880° C. and wherein said longitudinal dams (10, 10') are disposed in and extend along the said zone where the temperature of the glass ribbon is in the range of from about 970° to about 880° C.

4. The apparatus as defined in claim 2 further including means whereby a generally upstream zone of the molten glass is maintained at a temperature range of from about 970° to 880° C. and wherein said longitudinal dams (10, 10') are disposed in and extend along the said zone where the temperature of the glass ribbon is in the range of from about 970° to about 880° C.

5. The apparatus as defined in claim 1 wherein said longitudinal dams (10, 10') and the transverse dam (13) form a U-shape in plan view, and the ends of said dams (10, 10') remote from the transverse dam (13) have at least a portion thereof which terminate a predetermined spaced distance from said end wall means (11, 11') to form the path portion adjacent the upstream end of the tank and bath for reentry of said backflow currents.

6. The apparatus as defined in claim 1 wherein said longitudinal dams (10, 10') and the transverse dam (13) form a U-shape in plan view, and the ends of said dams (10, 10') remote from the transverse dam (13) adjoin said end wall means (11, 11') and are provided with submerged openings therein near by said end wall means (11, 11') to form the path portion adjacent the upstream end of the tank and bath for reentry of said backflow currents.